C. F. & C. D. SMITH.
COTTON CHOPPING ATTACHMENT FOR CULTIVATORS.
APPLICATION FILED MAR. 16, 1912.

1,034,038.

Patented July 30, 1912.

Charles F. Smith and
Clyde D. Smith, Inventor

Witnesses by C. A. Snow & Co.
Attorneys

UNITED STATES PATENT OFFICE.

CHARLES F. SMITH AND CLYDE D. SMITH, OF HAMILTON, TEXAS.

COTTON-CHOPPING ATTACHMENT FOR CULTIVATORS.

1,034,038.     Specification of Letters Patent.     Patented July 30, 1912.

Application filed March 16, 1912. Serial No. 684,255.

*To all whom it may concern:*

Be it known that we, CHARLES F. SMITH and CLYDE D. SMITH, citizens of the United States, residing at Hamilton, in the county of Hamilton, State of Texas, have invented a new and useful Cotton-Chopping Attachment for Cultivators, of which the following is a specification.

This invention relates to a cotton chopping attachment for cultivators, one of its objects being to provide a simple and durable structure of this type which can be connected readily to an ordinary cotton cultivator and which will operate at any speed desired for cutting plants from the row along which the cultivator is drawn, the blades of the chopper acting on the plants immediately subsequent to the cultivation thereof.

A further object is to provide simple means for connecting the attachment to the cultivator.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
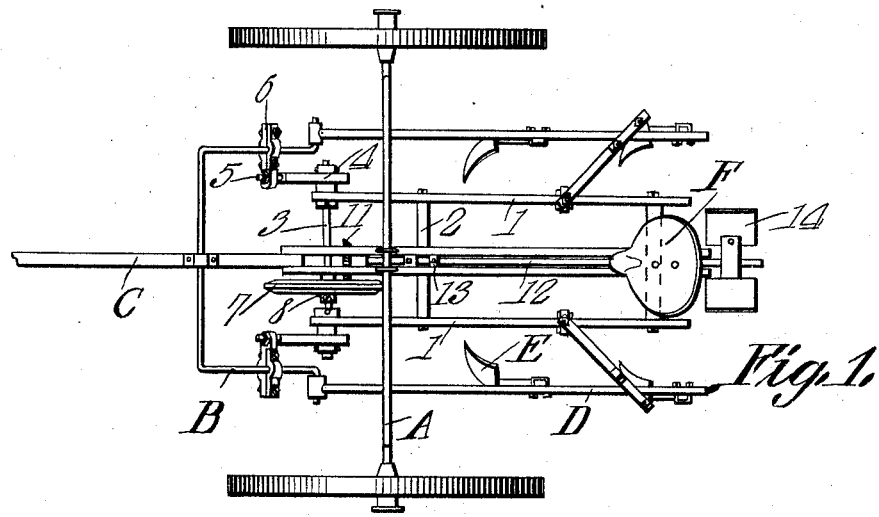
Figure 2:
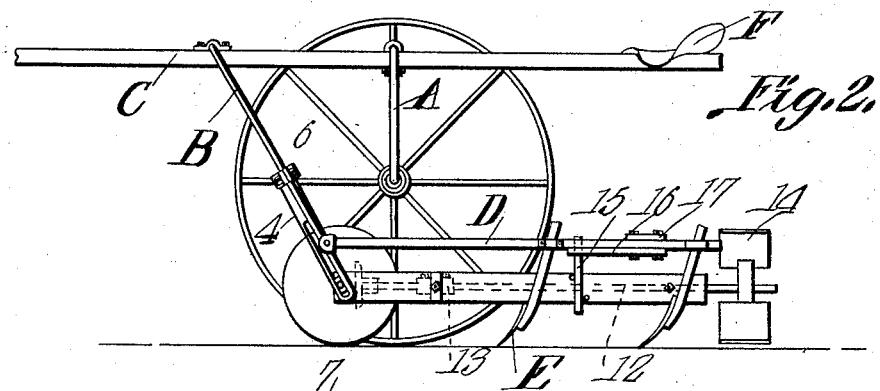
Figure 3:
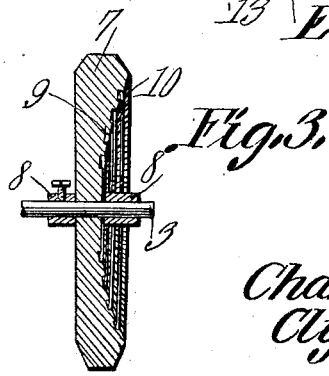

In said drawings:—Figure 1 is a plan view of a portion of a cultivator and showing the cotton chopping attachment connected thereto. Fig. 2 is a side elevation of the parts shown in Fig. 1, one of the supporting wheels of the cultivator being removed. Fig. 3 is an enlarged section through the drive wheel of the cotton chopping attachment.

Referring to the figures by characters of reference A designates the arch axle of a cultivator, there being arms B extending downwardly from the tongue C of the cultivator and these arms being pivotally engaged by the beams D to which the shovels E are connected. Only a part of this cultivator has been shown and it is to be understood that the cultivator does not constitute any part of the present invention but is merely one of the ordinary type used in cultivating cotton.

The attachment constituting the present invention consists of side beams 1 connected at suitable intervals by cross members 2 thus to form a rigid frame. A nonrotatable shaft 3 extends transversely of the front portion of the frame and has its ends projecting laterally beyond the side beams 1. These projecting ends are pivotally engaged by longitudinally slotted hangers 4 the upper ends of which are provided with stems 5 pivotally engaged by clamps 6. These clamps engage the arms B and can be adjusted so as to extend therefrom at any points desired. By providing this connection it will be seen that shaft 3 is capable of sliding within the slots in the hangers 4. A supporting wheel 7 is mounted for rotation on the shaft 3 and is held against lateral displacement on the shaft by means of collars 8 fastened to the shaft by set screws or the like. One face of this wheel is concaved, as indicated at 9, and has annular series of gear teeth 10 thereon. Any one of these series of teeth is adapted to mesh with a gear 11 secured to one end of a shaft 12. This shaft is journaled within the cross members 2 and extends longitudinally of the frame of the chopping attachment, there being collars 13 secured to the shaft at opposite sides of one of the cross members 2 so as to hold the shaft against longitudinal movement relative to the frame. It will be apparent that by adjusting shaft 12 and its gear 11 longitudinally of the chopper frame and by correspondingly adjusting the wheel 7 along shaft 3, the gear 11 can be brought into mesh with any one of the series of teeth 10 on the wheel 7. The rear end of shaft 12 is provided with a series of radially extending chopping blades or hoes 14. The side beams 1 extend through the lower portions of standards 15 and pivotally connected to the upper ends of the standards are connecting arms 16 having clamps 17 for attaching them fixedly to the beams D of the cultivator.

In operation the wheel 7 contacts with the ground at one side of the row of plants being cultivated. As the machine moves forward this wheel rotates and motion is transmitted from its teeth 10 to gear 11 and shaft 12 and the chopping blades 14 are thus caused to rotate. The speed of rotation of the chopping blades will of course depend upon the adjustment of the gear 11 relative to the teeth on the wheel 7. The operator occupying the seat F of the cultivator can place his feet on the beams 1 and thus press the attachment downwardly onto the ground with any desired force. Furthermore by having the shaft 3 slidably mounted within the hangers 4, the wheel 7 can move upwardly or downwardly over an uneven surface and independently of the wheels of the cultivator.

It will be seen that the attachment can be readily applied to a cultivator and will operate efficiently to chop the plants from the row at desired intervals.

What is claimed is:—

1. A cotton chopping attachment for cultivators and the like, including a frame, longitudinally slotted hangers, means for connecting said hangers to a portion of a cultivator structure or the like, means upon the frame for slidably engaging the hangers, a supporting wheel journaled within the frame and adjacent the hangers, means for connecting the frame to the cultivator beams, a shaft journaled within and extending longitudinally of the frame, a chopping element on the shaft, and means for transmitting motion to said shaft from the supporting wheel of the attachment.

2. A cotton chopping attachment for cultivators and the like, including a frame, hangers, means for attaching the hangers to a portion of a cultivator structure or the like, means on the frame for slidably engaging the hangers, said means being located at the front end of the frame, means adjacent the rear end of the frame for connecting the same to the beams of a cultivator or the like, a supporting wheel journaled within the front portion of the frame, a longitudinally extending shaft carried by the frame, a chopping element on the shaft, and means for transmitting motion from the supporting wheel to said shaft.

In testimony that we claim the foregoing as our own, we have hereto affixed our signatures in the presence of two witnesses.

CHARLES F. SMITH.
CLYDE D. SMITH.

Witnesses:
J. M. TRIMBLE,
J. S. POSTON.

Copies of this patent may be obtained for five cents each, by addressing the "Commissioner of Patents, Washington, D. C."